April 28, 1970

B. C. WRIGHT 3,508,387

HARVESTING ATTACHMENT FOR COMBINE

Filed Nov. 15, 1967

INVENTOR
BRUCE C. WRIGHT

BY:

ATT'Y

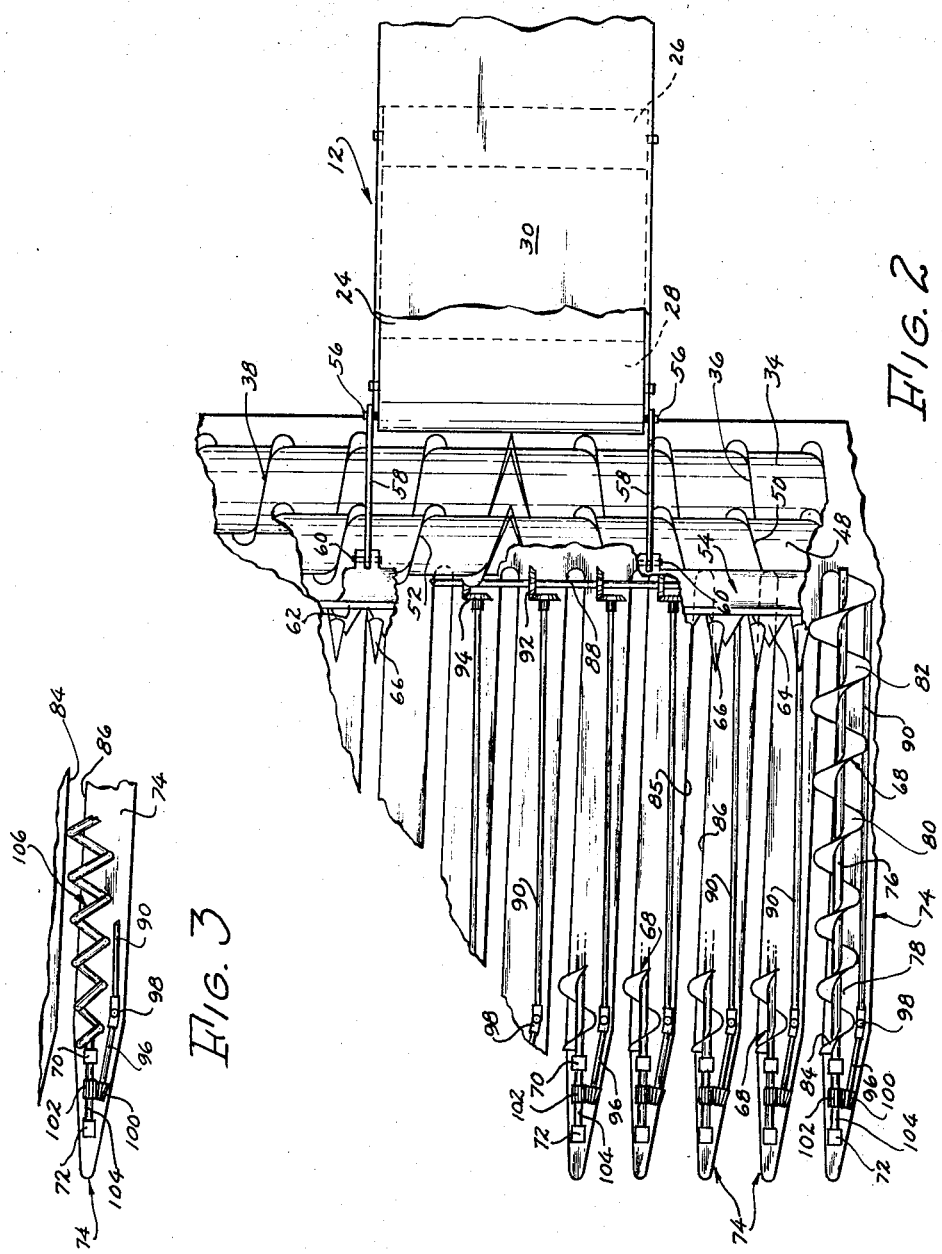

── # United States Patent Office 3,508,387
Patented Apr. 28, 1970

3,508,387
HARVESTING ATTACHMENT FOR COMBINE
Bruce C. Wright, Davenport, Iowa, assignor to J. I. Case Company, Racine, Wis., a corporation of Wisconsin
Filed Nov. 15, 1967, Ser. No. 683,215
Int. Cl. A01d 45/02
U.S. Cl. 56—95                                          4 Claims

ABSTRACT OF THE DISCLOSURE

A plurality of augers carried on the front of a combine and driven to gather and to convey the crop material rearwardly for delivery to the harvesting mechanism. The augers are spaced such that gathering and conveying of the material is accomplished regardless of the crop direction or row spacing of the plants.

BACKGROUND OF THE INVENTION

The self-propelled combine is now being used to harvest crops other than small grains such as wheat, oats, and the like. A recent attachment for combines is the corn head which is available in various width sizes from two to eight rows, probably the most common being the four row head. These harvesting attachments are also available for different row spacings such as 20–24 inch, 28–32 inch or 36–40 inch. Many of these recent attachments are also adjustable for operation when rows are 28–40 inches apart, the adjustment being a mechanical device or operation to either decrease or to increase the material opening or passageway between the dividers.

Other crop gathering and conveying devices have included the use of augers positioned to operate in and gather crops planted in rows spaced as mentioned. With the advent of more generous use of fertilizers and better weed control, the row crop spacing may in the future be reduced from 20 inches to perhaps 12 inches or less. Of course, crops other than corn or the like must be considered when designing combine heads or attachments, as corn and other crops of this type may be drilled or broadcast planted. If, for instance, corn was planted in 6 inch rows, the corn head now available would not operate properly because of the space required for the dividers and the gathering and conveying chains located in these units. An attachment should therefore be provided for a combine which will gather and convey the crop material to the harvesting mechanism, regardless of the row spacing of the stalks.

Another apsect of corn harvesting is the provision of separate cutting means, one above the other, to sever the stalk and also to top the stalk so that only the mid-portion with the attached ears goes into the harvesting unit. The positioning of these cutters with respect to the conveying means is a critical feature of this unit as the stalks of material must be captured or contained at the time the stalks are being cut so the crop material to be harvested will be positively carried into the combine.

SUMMARY OF THE INVENTION

The present invention relates to harvesting attachments for combines and more particularly to gathering and conveying means for crops planted in any row spacing and/or direction. The attachment includes a plurality of rotating augers driven in the same direction, and closely spaced so as to bring in the material regardless of the position or condition of the stalks. The spacing of the augers may be at 6 inches such that a nominal 10 foot attachment would have 21 augers across the front of the combine.

Each of the augers has three sections or portions, these being the gathering portion, the conveying portion, and the timing portion. The gathering portion of each auger is of such a diameter and pitch at the forward end thereof to introduce the stalk between the augers and to commence the rearward movement of the stalk. The conveying portion of each auger is rearward of the gathering portion and may be of larger diameter and different pitch. A timing portion of each auger rearward of the conveying portion engages and holds the stalk as it is being cut. The latter portion may be of the same or a different diameter than the conveying portion and the pitch may also be different from that of the other portions.

The header also includes openings or slots between the dividers which permit the stalk to travel rearward to the cutters as it is engaged and conveyed by the augers. These slots are disposed angularly from the augers and do not follow a straight path between the augers but are directed under the augers such that the conveying and timing portions positively engage the material in its rearward travel.

During engagement of the stalk by the timing portion of the auger, a lower cutter cuts the stalk at the desired height above the ground, and an upper cutter severs the top of the stalk. The mid-portion of the stalk is further conveyed to the harvesting mechanism and the top portion is allowed to fall over the rear of the attachment onto the ground.

The advantages of the harvesting attachment as disclosed include expected power savings in the drive for the augers, and the ability to harvest crops which are down or where there are adverse conditions in weeds and grass. Another advantage of the multi-auger header, as stated above, is the ability to gather the material independently of the direction of planting and/or cultivation, and without consideration of the spacing between rows. The attachment may be set at the desired elevation so that the lower cutter severs the stalk just below the ears of corn and the upper cutter can be adjusted in elevation to sever just above the ears.

Other features and advantages of the invention will become apparent from a reading of the following description taken together with the annexed drawings, in which:

FIGURE 2 is a plan view of the attachment showing a plurality of the augers; and FIGURE 3 is a plan of view showing a different structure.

Figure 1:
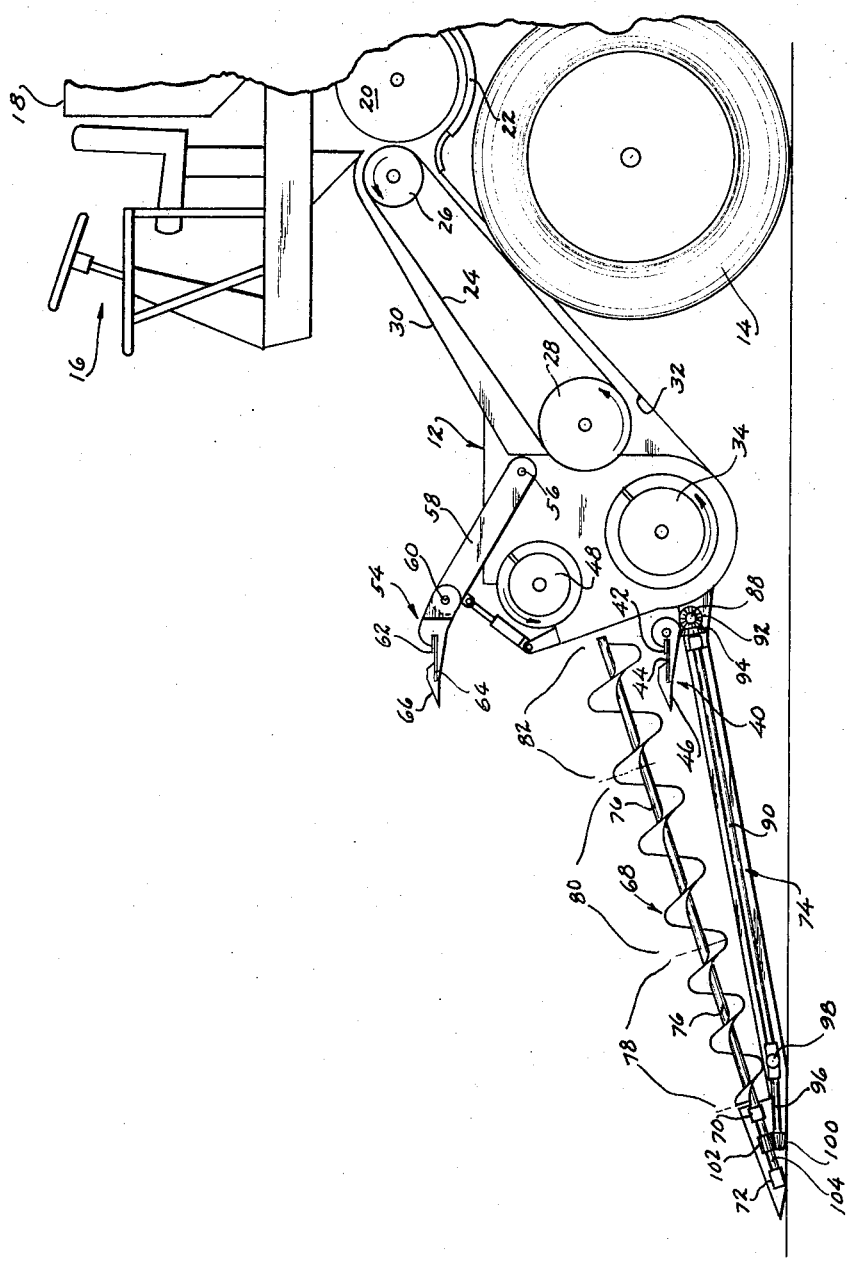
FIGURE 1 is a side view of the attachment on the front of a combine showing an auger and the drive therefor.

As seen in FIG. 1, there is disclosed the front portion of a combine 10, having a header structure 12 attached on suitable framework. The combine body is carried on traction wheels 14 and steerable wheels (not shown). The machine, of course, includes an operator's station 16, a grain bin 18, and threshing mechanism. This mechanism utilizes a cylinder 20 journaled in suitable bearings adjacent and normally above a concave 22, and additional mechanism is disposed rearward of the cylinder for further harvesting of the crop material.

A feeding mechanism such as a conveyor belt 24 or the like is driven by means of rollers 26 and 28 suitably supported in a feeder enclosure 30 attached to the combine. The direction of rotation of the rollers and the belt is as indicated by the arrows such that crop material is moved rearwardly and upwardly on surface 32 of the enclosure to the cylinder 20.

Header structure 12 carries a two-way cross-conveying auger 34 having spirals 36 and 38, spirals 36 being on the left-hand side and spirals 38 being on the right-hand side, as viewed in the direction of travel of the machine. The auger 34 is driven in the direction shown in FIG. 1. A conventional reciprocating type sickle assembly 40 is supported forward of auger 34 and is driven by a suitable pitman drive. The sickle, of course, includes the sickle bar 42, the knives 44 and guards 46.

A second two-way cross-conveying auger 48 having spirals 50 and 52 is supported upwardly from the first auger 34. Auger 48 may be driven from the same drive that rotates auger 34, taking into account the smaller diameter and also the desired speed thereof, A second sickle assembly 54 is pivotally supported from the header as at 56 by means of links or straps 58 and pivots 60. Sickle assembly 54 is supported such that its sickle bar 62, the knives 64, and the guards 66 are adjustable in relation to the ground and to assembly 40. Sickle assembly 40 is lowered or raised as the header height is adjusted in relation to the ground, and assembly 54 is pivotally raised or lowered depending upon the height of the crop being harvested. In the case of corn, the lower sickle may be set to cut the stalks a foot or so above the ground and the upper sickle would be positioned to cut the stalks above the ears. It is thus seen that only the mid-portion of the crop, in the case of corn, is conveyed into the harvesting mechanism. It is, of course, understood that sickle assembly 54 is adjustable in elevation by means of pivots 56 and 60, and then is secured to maintain it at the desired position.

The crop gathering and conveying mechanism will now be described. As seen in FIGS. 1 and 2, the header 12 supports and carries a plurality of augers designated as 68, to gather in and convey the stalk material rearward to the cutting sickles. These augers are directed forwardly and downwardly from the cross augers and are supported in bearings 70 and 72. The augers are positioned above dividers 74 which have points for picking up and separating the stalks of material so that the stalks are directed between the augers as the combine moves through the field. The auger shaft 76 carries the spiral flights and is journaled in above-mentioned bearings. Bearings 70 and 72 fully support the augers 68 at the front thereof such that the rear portion is cantilevered and effects a floating action so as not to be susceptible to clogging or binding by material. The rear end of each auger is therefore permitted to move a slight amount in response to the material being conveyed at a given time. The number of augers, which are a part of the attachment, depend upon the space desired between adjacent augers and also upon the width of the combine header. In the specific embodiment, the augers are placed on 6 inch centers so that a nominal 10 foot header would include 21 augers. The closely spaced augers are therefore adaptable for use in fields where the crops are planted in rows or where the crops are broadcast planted; in other words, the direction and spacing of the crop stalks are immaterial when gathering the crop with the structure of the present invention.

The specific construction of each auger includes a gathering portion 78, a conveying portion 80, and a timing portion 82. Auger portion 78 includes flights 84 of a diameter to pick up any down stalks and introduce them into the conveying portion. The flights increase in diameter from the front of the gathering portion to the adjacent or conveying portion 80, as best shown in FIG. 1. The conveying portion flights are of larger diameter than the gathering portion and the pitch of these flights is less than the gathering flights as the stalk material needs only to be held in an upright position to be conveyed rearwardly.

The third or rear portion is the timing section 82 which may have flights of increasing diameter from those of the preceding portions. The pitch of the flights in the timing portion may be the same as that of the conveying portion, thus making for a simpler and less costly design. The timing portion serves a specific function in the harvesting as the stalks are in this area when cut by the sickles. The stalks of material are thus timed or held for proper cutting while in the upright position. It should be noted that the augers extend rearwardly of the sickle knives and also that the upper sickle is generally located directly above the lower sickle. This position of the upper sickle would, of course, change slightly fore and aft as the sickle was adjusted to a new elevation.

As seen in FIG. 2, the dividers 74 provide fore and aft slots defined by edges 85 and 86. These slots are angularly disposed from the front portion of the dividers such that the rear of the slots is under the timing portion of the augers and the stalks are moved into position next to the shafts 76 when being cut. This displacement of the slots positively directs the stalks of material between the auger flights and the stalks are held for proper cutting by the sickles. It should be noted that the flights extend substantially outwardly from the shaft so that there is a minimum of interference from the shaft as the stalk is ready to be cut. While FIG. 2 shows a plurality of augers and dividers, the left and right sides of the attachment would normally extend fore and aft to provide straight side panels and the dividers would merge into these panels.

The drives for the various parts of the combine such as the harvesting cylinder 20, the feeding rolls 26 and 28, the augers 34 and the lower sickle bar 42 are obtained with conventional belts, pulleys, chains, sprockets and the like. The drive for auger 48 is obtained from an extension of the drive for auger 34, and the drive for the upper sickle bar 62 is likewise obtained from an extension of the reciprocating drive for sickle bar 42.

The drive for the augers 68 is positioned downwardly of the cutter bars and since each auger turns or rotates in the same direction, an individual drive must be provided for each auger. Of course, a common manifold may be used but the individual drives must be so placed so as not to interfere with the crop material as it is being moved rearwardly toward the harvesting cylinder. A common manifold shaft 88 is driven from a suitable variable speed drive to allow matching the speed of augers 68 to the ground speed of the combine. Individual shafts 90 to each of the augers 68 are driven by means of a bevel gear 92 fixed on shaft 88 and matching with a bevel gear 94 on the individual drive shaft. Shaft 90 drives a short shaft 96 through a universal type joint 98 to provide for flexibility at the forward end of the drive train. Shaft 96 carries a bevel gear 100 matching and driving a bevel gear 102 on a shaft portion 104 between the bearings 70 and 72.

As stated above, the dividers define slots therein which are located generally intermediate the augers and which slots run rearwardly at a slight angle in respect to the auger axes. These slots provide guide means for the crop material as it is moved rearwardly. It should be noted that since the augers are driven in the same direction, each auger must work independently of the others, so as to prevent the action of one from cancelling the action of an adjacent auger. As soon as the crop material is picked up and separated into lines or rows by the points of the dividers, the material is directed into engagement with one of the augers by the guiding action of the slot. As the augers move forward through the crop material, the material between each of the augers is forced or guided towards the auger. In the embodiment shown in FIG. 2, the material is guided slightly to the left as viewed in the direction of travel of the machine and with the augers rotating in a clockwise direction.

It is thus seen that herein shown and described is a harvesting attachment for a combine which accomplishes all the advantages and features as set out above. The attachment provides auger type gathering and conveying units closely spaced to work in crops regardless of the direction or spacing of the stalks. Augers 68 are specifically described as being flight sections secured to the shaft 76; however, a shaft may not be required if the conveying means takes the form of a coiled spring 106 or an open helical type structure, as shown in FIG. 3. A coiled spring driven say in a clockwise direction would also move stalk material along in the slot to the cutting means. In the embodiments shown, all the augers would be driven in a clockwise direction as viewed from the operator's station as the slots are directed leftwardly from front to rear. The stalks would be forced along the slots to a position nearly under the centerline of the augers in the timing section where the center portion of the stalks would be cut and this portion then further conveyed to the harvesting mechanism. Other variations may occur to those skilled in the art, and it is to be understood that all such variations are contemplated as being within the scope of the invention. The invention is not intended to be taken as limited by the embodiments disclosed, nor in fact, in any manner except as defined in the following claims.

What is claimed as new and desired to be secured by Letters Patent of the United States is:

1. In a harvesting attachment for a combine movable in a fore-and-aft direction and having drive means, an attachment frame carried on the front of said combine, a plurality of parallel disposed augers rotatably supported by said frame and with each of said augers having a shaft and a continuous flight defining a crop gathering portion at the auger front end and a crop conveying portion intermediate the length of said flight and a crop timing portion at the rear end of said flight which is located adjacent said combine, drive connectors operatively connecting said drive means and said augers for rotating the latter in a common direction, a crop guide means for each of said augers extending below each of said augers and offset to one side of a respective vertical plane in said fore-and-aft direction along which each of said shafts extends, to have said crop guide means engage said crop and direct it into said auger flights toward said shaft, crop cutters carried by said combine and disposed above and below said augers on a vertical plane transverse to said fore-and-aft direction and through which said timing portions extend, said cutters being spaced directly above and directly below said timing portions for cutting said crops held by said timing portions, and said crop guide means further extending across the vertical plane extending along the edge of said flight of said timing portion, for directing said crop into said timing portion flight.

2. The subject matter of claim 1, wherein said crop guide means consists of two spaced-apart and parallel surfaces defining a slot, and with said slot being angularly disposed relative to said fore-and-aft direction.

3. The subject matter of claim 1, wherein said drive means includes a drive means shaft rotatably mounted on said combine and extending transverse to said fore-and-aft direction, and said drive connectors include a drive shaft for each of said augers and rotatably carried by said frame extending below said augers and rotatably carried by said frame extending below said augers and substantially parallel thereto and in driven relation to said drive means shaft.

4. The subject matter of claim 3, including a bearing supported on said frame for each of said augers, the forward end of each of said augers being rotatably mounted in a respective said bearing and with the rearward ends of said augers being free to move laterally of said fore-and-aft direction.

References Cited

UNITED STATES PATENTS

| | | | |
|---|---|---|---|
| 880,362 | 2/1908 | Cooper | 56—5 |
| 2,316,475 | 4/1943 | Viken. | |
| 2,338,932 | 1/1944 | Grant | 56—238 XR |
| 2,933,876 | 4/1960 | Davin | 56—119 |
| 3,399,517 | 9/1968 | Magee | 56—238 |

FOREIGN PATENTS

| | | |
|---|---|---|
| 827,647 | 4/1938 | France. |
| 684,829 | 12/1952 | Great Britain. |

ROBERT PESHOCK, Primary Examiner

J. A. OLIFF, Asistant Examiner